April 17, 1962
G. C. ABBOTT
3,029,856
LOCK NUT WITH DISPLACED THREAD PORTION
Filed Aug. 14, 1956
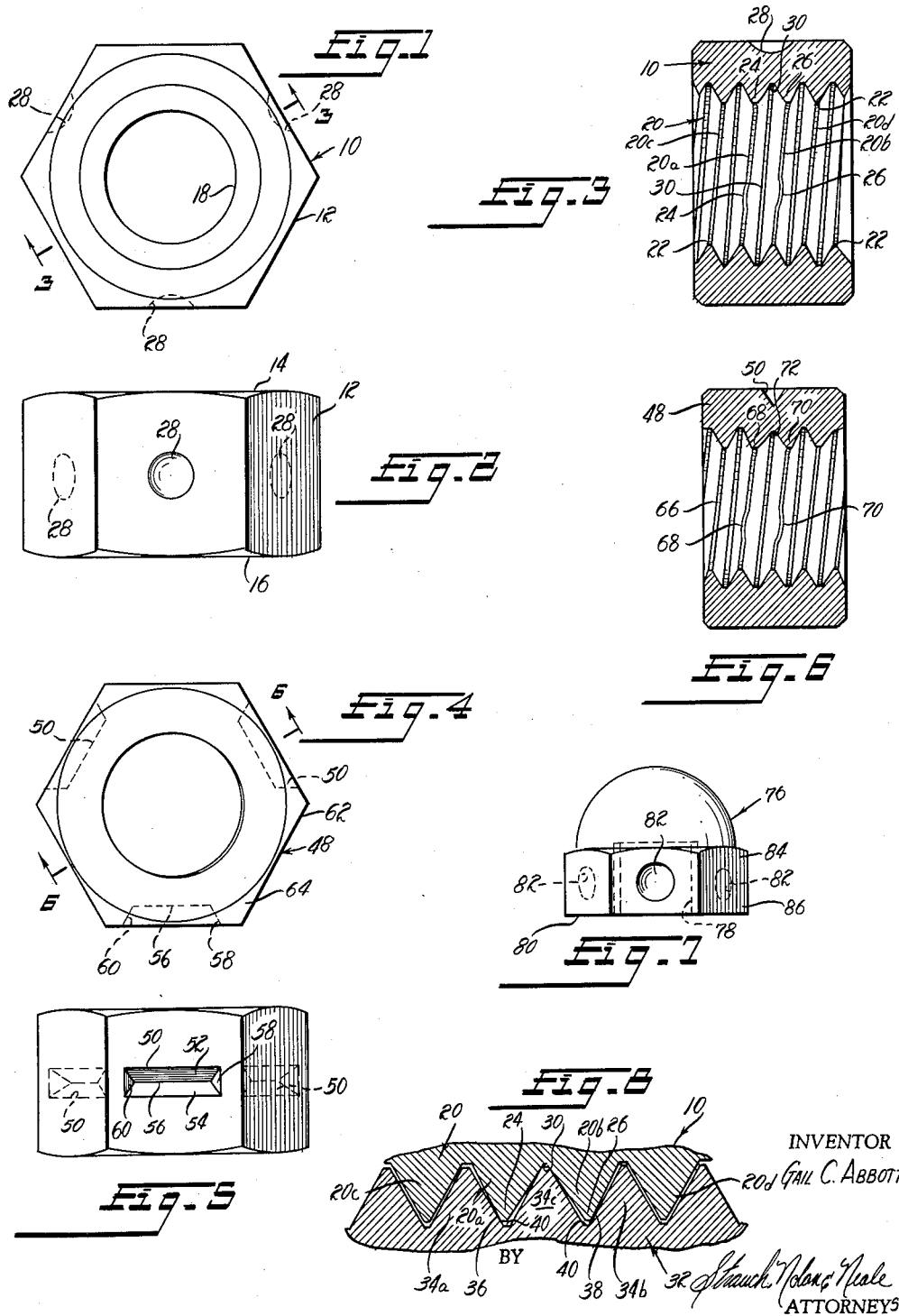
INVENTOR
GAIL C. ABBOTT
BY
Strauch, Nolan & Neale
ATTORNEYS United States Patent Office 3,029,856
Patented Apr. 17, 1962

3,029,856
LOCK NUT WITH DISPLACED THREAD PORTION
Gail C. Abbott, South Whitley, Ind., assignor to Grip Nut Company, South Whitley, Ind., a corporation of Illinois
Filed Aug. 14, 1956, Ser. No. 603,921
5 Claims. (Cl. 151—21)

This invention relates to self-locking nuts and more particularly to self-locking nuts in which the thread is deformed over limited areas inwardly of the nut end faces to frictionally grip the thread of a mating bolt and to methods of fabricating such nuts.

The widespread use of self-locking nuts in production line manufacturing operations has emphasized the need for improved constructions which reduce the cost of manufacturing the nuts, which increase the speed and the ease with which the nuts may be applied and which will provide for more uniform and controllable locking action.

It is also particularly important where large numbers of the nuts are used in high speed assembly techniques that the locking action be such that the nuts may be applied to a bolt with either face presented to the bolt. This requirement can be met only by a nut in which the locking action is effected inwardly from the ends of the nut as distinguished from at either of its ends. A similar requirement is presented in the case of the well known acorn nuts which are closed at one end. Such a nut may be applied to a bolt only if the nut body and the threads adjacent the open end are entirely free from distortion.

Because of the difficulties of satisfying these requirements at the present time, there are no self-locking nuts of the reversible type or the "acorn" type presently in commercial use with the exception of those nuts which employ non-metallic separate locking devices.

One of the many attempts to solve the problem of providing a commercially acceptable reversible self-locking nut is disclosed in United States Patent No. 2,686,546 issued August 17, 1954, to J. A. MacLean, Jr. for Self-Locking Nut and Process of Manufacturing Same. In this construction, the locking action is produced by deliberately deforming an entire nut body while avoiding localized distortion or deformation of the individual threads. In the production of such locking nuts both the general apparatus for supporting the nut body during its manufacture and the tools for effecting the nut body deformation are selected to minimize localized deformation of the thread produced by penetration of the outer nut wall which is incidental to the bodily bending of the walls of the nut body. The relatively high localized pressures required to bend the nut body as a whole beyond its elastic limit unavoidably results in some penetration by the deforming tool. This incidental penetration as practiced in the past involves a shearing action which effectively but undesirably protrudes the roots and crests of certain of the threads toward the center of the nut bore.

Experience has shown that while this action may theoretically produce a locking effect, in production the locking action cannot be accurately predetermined or controlled within the limits required in manufacture because of variations in physical characteristics of the material of the nut body and other factors.

It has also been observed that prior locking nuts produce objectionable thread damage in galling upon the mating bolt. This damage, it has been determined, results directly from the protrusion of the root of the thread which is inherently and unavoidably associated with deforming the metal of the nut body in shear.

With the foregoing considerations in mind it is the principal purpose and object of the present invention to provide improved self-locking nuts which eliminate the above stated disadvantages of prior lock nuts and which provide a novel locking action which is characterized by low application torque, high breakaway torque, minimum galling action on the mating part, controllability of the locking action and maintenance of the locking action even after repeated applications.

In accordance with the present invention these primary objectives are obtained by departing entirely from the practice suggested by the prior art and by flow deforming portions of the nut body with no shearing action or very little shearing action in a manner to cause the threads of the nut to spread thus changing the pitch of discrete portions of the thread with substantially no alteration in the position of the base or root of the thread.

In accordance with the invention the flow deforming of the selected areas of the nut body is effected by use of a tool developed particularly to laterally and angularly displace selected areas of the nut body wall as distinguished from the prior art which has been dependent upon distortion of the entire nut body and actual bodily bending of the walls of the nut. The action of the present invention results in minimum displacement of the side walls of the nut body so that the nut is free to enter and properly cooperate with socket or other wrenches.

It is, accordingly, a further object of the invention to provide improved self-locking nuts in which the locking action is effected by spreading discrete portions of adjacent threads near the center of the nut without materially altering the minor diameter of the threads.

It is also an object of the present invention to provide improved self-locking nuts in which the locking action is produced by cold flowing portions of the nut body with negligible shearing action thereby avoiding bodily protrusion of material portions of the nut metal into the nut bore.

These and other objects of the present invention will become more fully apparent by reference to the appended claims and as the following detailed description proceeds in reference to the accompanying drawings wherein:

FIGURE 1 is a top plan view of a nut embodying locking characteristics produced according to the principles of the present invention;

FIGURE 2 is a front elevational view of the nut of FIGURE 1;

FIGURE 3 is a sectional view of the nut of FIGURE 1 taken substantially along the line 3—3 of FIGURE 1;

FIGURE 4 is a top plan view of a nut constituting a second embodiment of the present invention;

FIGURE 5 is a front elevational view of the nut of FIGURE 4;

FIGURE 6 is a transverse sectional view taken substantially along the line 6—6 of FIGURE 4;

FIGURE 7 is a front elevational view of an acorn nut provided with locking characteristics in accord with the principles of the present invention and constituting a third embodiment thereof; and FIGURE 8 is a fragmentary radial section through a bolt on which has been threaded a nut constructed in accordance with the present invention.

Referring now to the drawings and particularly to FIGURES 1, 2 and 3, the nut 10 therein illustrated has a cold formed metallic body of hexagonal cross section defined by intersecting side walls 12 and terminating in opposed end faces 14 and 16 through which is formed a through bore 18 coaxial with the hexagonal cross section of the nut 10. Bore 18 is suitably tapped to form a continuous internal thread 20 which is preferably, although not necessarily, of the conventional American Standard form in cross section as shown in FIGURE 3.

As is apparent from FIGURE 3, the minor diameter of the thread 20 defined by the crest 22 thereof is substantially uniform throughout the length of the thread 20. In the initial formation of the thread 20 within the nut 10, the thread is of conventional form having constant major and minor diameters and a predetermined constant pitch throughout the length of the thread. In order to render this nut 10 a self-locking nut, symmetrically circumferentially spaced pairs of thread portions 24 and 26 of adjacent thread convolutions 20a and 20b are deformed axially of the thread 20 so that the axial distance or pitch between portions 24 and 26 is greater than the normal pitch of the thread 20. Also the axial spacing between the crest of the thread convolution 20a at portion 24 and the crest of the adjacent thread convolution 20c is less than the normal pitch of the thread 20 and the axial spacing between the crest of the thread convolution 20b at the portion 26 and crest of the next adjacent thread convolution 20d is less than the normal pitch of the thread 20. In the embodiment of the invention shown in FIGURES 1, 2 and 3, there are three such discontinuities in the pitch of the thread 20, one in radial alignment with each of the three surface indentations 28 in the side walls 12 of the nut 10 shown in FIGURE 1. It will be noted from reference to FIGURE 3 that there is also a discontinuity in the major diameter of the thread 20 at each of the points 30 between the pairs of thread portions 24 and 26, points 30 being radially inwardly displaced slightly relative to the normal major diameter of the thread 20.

Referring now to FIGURE 8 in which the nut 10 is shown threaded upon a bolt 32, it is apparent that the discontinuities in the pitch resulting from the opposite axial displacement of the portions 24 and 26 of the thread 20 produce a tight wedging action of the walls of thread convolutions 20a and 20b upon the walls of thread convolutions 34a and 34b of the bolt 32 at the regions 36 and 38 to establish a firm locking engagement between the nut 10 and the bolt 32 without producing galling of the threads of the bolt 32 at their roots. Inward displacement of the portion 30 of the thread 20 of the nut 10 is insufficient to produce galling with the crest of the thread convolution 34c.

The foregoing described discontinuity in the pitch of the thread 20 is produced by forcing a radially directed angularly walled indenting die into alternate ones of the faces 12 to displace the body metal along paths right angularly related to the punch surfaces to form the indentations 28. The face of the indenting die contacting the nut face 12 to form the indentation 28 is so formed that the face 12 can be readily indented without producing distortion or deformation of the nut body and while maintaining shear of the material of the nut body at an absolute minimum. In the embodiment of FIGURES 1, 2 and 3, this is achieved by the use of indenting dies having work engaging end faces which are segments of a sphere so that the initial point of contact is a point and the area of contact gradually increases radially of the initial point contact as the nut body metal is displaced in all directions.

By use of an indenting die of this formation, the radially displaced portion of body metal is generally wedge-shaped directed radially toward the nut portion 30 to slightly radially inwardly displace the portion 30 and axially spread the adjacent thread convolution portions 24 and 26 to the left and right respectively as viewed in the FIGURE 3 with substantially no inward displacement of the crest of the thread convolutions 20a and 20b at those regions 24 and 26.

In the second embodiment of the invention shown in FIGURES 4 to 6, the pitch discontinuities are formed by utilizing indenting dies effective to form hipped-shaped recesses 50. These hipped-shaped recesses have planar side walls 52 and 54 intersecting in a line 56 lying in a plane normal to the axis of the nut, and planar end faces 58 and 60 which slope inwardly at a substantial angle the apex of which preferably lies radially outwardly from the axis of the nut. The indentations 50 are formed at symmetrically located circumferentially spaced positions about the nut axis to mid-way between its end faces and preferably in alternate ones of the faces 62 of the nut body 64. With the exception of the configuration of the indentations 50, nut 48 is of identical structure to the embodiment shown in FIGURES 1–3, the formation of the indentations 50 being effective to form discontinuities in the pitch of the internal thread 66 at regions 68 and 70 in substantially the same manner and for the same purpose as has been described in detail above in reference to FIGURES 3 and 8. An indenting die producing the hipped-shaped configuration of the recess 70 is effective to displace the nut body metal in all directions without distorting the nut wall. Thus radial inward displacement of the aligned portions 72 of the root of the thread 66 intermediate portions 68 and 70 and axial separation of the portions 68 and 70 is effected to produce the desired pitch discontinuity without producing any material discontinuities in the minor diameter of the thread 66. The hipped-shaped configuration of the indenting die forming the indentation 50 initially engages the nut in line contact and produces a hipped-shaped region of right angularly displaced body metal in the nut 48 and maintains the shear of the body metal at substantially zero. This prevents inward radial movement of the crests of the thread 66 at the regions 68 and 70 as in the prior embodiments. The locking action of the nut shown in FIGURES 4–6 is identical with that which has been described in detail in reference to FIGURE 8 and in connection with the embodiment of FIGURES 1–3.

FIGURE 7 illustrates the application of the present invention to an acorn nut 76 which is formed with a threaded bore 78 through the end face 80 thereof and which has segmental spherical indentations 82 formed in alternate ones of the side faces 84 of the hexagonal cross section wrench receiving body portion 86 of the nut 76. Penetration of the indenting die into the nut body to form indentations 82 in the nut 76 produces discontinuities in the pitch of the thread of the threaded bore 78 in the same manner as in the previous embodiments. Either a hipped shaped indentation or a segmental spherical indentation may be used.

The indentations 28 in the embodiment of FIGURES 1–3 and the indentations of the embodiment of FIGURES 4–6 are preferably formed midway of the length of the threaded portion of the bore of those nuts so that there are undistorted threads at each end of the nut which may be utilized to start the nut on the bolt to which it is to be attached before it becomes necessary to use a wrench to fully thread the nuts onto the bolts in their final position. The location of the thread discontinuity adjacent the mid portion of the threaded bore permits the nuts of the embodiments of FIGURES 1 to 3 and 4 to 6 to be applied to the bolt in either direction and thus facilitates greatly the assembly.

While it is not essential in the embodiment of FIGURE 7 that the indentation 82 be formed exactly midway of the length of the threaded board 78, it is advisable for the indentation to be spaced sufficiently well back from the end face 80 of the nut 76 to permit manual application of the nut to a bolt before the threads of the bolt contact the distorted portions of the threads.

From the foregoing detailed description, it is apparent that the present invention provides a greatly improved lock nut and method of manufacturing lock nuts. The nuts of the present invention result in relatively low application torque and relatively high breakaway torque. Damage to the threads of the bolt to which the nut is applied at the root and crest of the bolt thread is eliminated with the result that repeated reapplications of the nuts produce the same locking force. For example, tests using ½-inch centerlock nuts produced in accord with this invention utilizing ¼-inch stopped-off ball punches .021 inch deep gave the following results:

| Test No. | Punch Pressure, 1,200 p.s.i. | Punch Pressure, 1,300 p.s.i. |
|---|---|---|
| 1 | 100 lbs. torque—20 applns | 112 lbs. torque—3 applns. |
| 2 | 95 lbs. torque—15 applns | 125 lbs. torque—10 applns. |
| 3 | ...do | 110 lbs. torque—5 applns. |
| 4 | 75 lbs. torque—5 applns | 125 lbs. torque—10 applns. |
| 5 | 80 lbs. torque | 110 lbs. torque—5 applns. |
| 6 | ...do | 95 lbs. torque—20 applns. |
| 7 | 70 lbs. torque—10 applns | 110 lbs. torque—5 applns. |
| 8 | 80 lbs. torque | Do. |
| 9 | 45 lbs. torque—35 applns | 125 lbs. torgue—10 applns. |
| 10 | 85 lbs. torque—5 applns | Do. |
| Average torque. | 80.5 lbs | 114.7 lbs. |
| Average scatter. | 10.5 | 8.3. |

As a result of these tests it was established that the relative average scatter (average scatter divided by average torque) was 0.13 utilizing the 1200 p.s.i. punch and 0.07 utilizing the 1300 p.s.i. punch. Additional vibration tests reported to applicant show that the center-locking type nut of this invention meets the Government's AN specifications, the most difficult specifications to be satisfied by a self-locking nut.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A side indented lock nut pre-formed from a standard nut and adapted to be threaded upon and from a complementary externally threaded member, said nut comprising an axially extending body of polygonal external cross section terminating at at least one end in a planar end face portion normal to said axis, said body having an axially extending internal continuously threaded cylindrical bore extending from said end face, the thread of said bore having an uninterrupted crest of uniform width and the minor diameter of said thread being substantially constant along the entire length of the threaded portion of said bore, the pitch and major diameter of said thread being substantially constant over the major portion of the length of the threaded portion of said bore and at each end region thereof, there being a portion of said thread intermediate said end regions of the threaded portion thereof in which there are a plurality of discrete discontinuites in the major diameter and pitch of said thread symmetrically circumferentially disposed about the axis of said bore and lying substantially in a common plane normal to the bore axis and the thread of the remainder of said portion being in continuous helical alignment, said discrete discontinuities in the major diameter and pitch each comprising portions in which the root of the thread is disposed radially inwardly of the normal major diameter of the thread and in which the portions of the crests of the thread convolutons at each side of and in radial alignment with inwardly disposed root portion are axially spaced a distance greater than the normal pitch of said thread and the axial spacing between said crest portions and the crest of the next adjacent thread convolution is less than the normal pitch of said thread.

2. A side indented lock nut pre-formed from a standard nut and adapted to be threaded upon and from a complementary externally threaded member, said nut comprising a metallic body of polygonal external cross section having a helically threaded bore extending from at least one end face thereof and of substantially constant minor diameter throughout its length, the thread of said bore having an uninterrupted crest of uniform width throughout its length, the portions of the thread at the opposite ends of said bore being of uniform pitch and major diameter and in helical alignment, said nut having at a plurality of symmetrically circumferentially spaced points about the axis of said threaded bore intermediate said end portions of said bore a like plurality of wedge shape zones of radially inwardly disposed metal extending toward the root of said thread, the axial spacing between the crests of the portions of the thread convolutions on the opposite sides of said zones being of greater magnitude than the pitch of the remainder of said thread.

3. The side indented lock nut defined in claim 2 wherein said indentation is of hipped-shape configuration having intersecting side walls terminating in a line of intersection lying in a plane substantially normal to the axis of the threaded bore and interconnecting triangular end faces lying substantially in planes intersecting in a line parallel to the axis of the said bore.

4. The side indented lock nut defined in claim 2 wherein each of said portions of radially inwardly cold flowed metal terminates in a concave indentation in the exterior surface of said nut.

5. The side indented lock nut defined in claim 4 wherein said indentation is of segmental spherical form.

References Cited in the file of this patent

UNITED STATES PATENTS

| 550,898 | Richardson | Dec. 3, 1895 |
| 1,519,125 | Furlan | Dec. 16, 1924 |
| 1,660,455 | Plum | Feb. 28, 1928 |
| 1,692,497 | Furlan | Nov. 20, 1928 |
| 2,519,417 | Tripp | Aug. 22, 1950 |
| 2,592,128 | Engstrom | Apr. 8, 1952 |
| 2,679,879 | Engstrom | June 1, 1954 |
| 2,754,871 | Stoll | July 17, 1956 |

FOREIGN PATENTS

| 10,396 | Great Britain | Aug. 13, 1886 |
| 114,185 | Australia | Nov. 20, 1941 |